United States Patent
Al Daif et al.

(10) Patent No.: US 12,264,580 B2
(45) Date of Patent: Apr. 1, 2025

(54) DETECTING GAS LEAKS IN OIL WELLS USING MACHINE LEARNING

(71) Applicant: Saudi Arabian Oil Company, Dhahran (SA)

(72) Inventors: Mohammed Y. Al Daif, Qatif (SA); Sultan S. Al Sumat, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/464,080

(22) Filed: Sep. 1, 2021

(65) Prior Publication Data

US 2023/0063604 A1    Mar. 2, 2023

(51) Int. Cl.

| | |
|---|---|
| *E21B 47/11* | (2012.01) |
| *E21B 47/002* | (2012.01) |
| *E21B 47/103* | (2012.01) |
| *E21B 47/113* | (2012.01) |
| *E21B 47/117* | (2012.01) |
| *G06F 18/214* | (2023.01) |
| *G06N 3/08* | (2023.01) |

(52) U.S. Cl.
CPC .......... *E21B 47/117* (2020.05); *E21B 47/002* (2020.05); *E21B 47/103* (2020.05); *E21B 47/113* (2020.05); *G06F 18/214* (2023.01); *G06N 3/08* (2013.01)

(58) Field of Classification Search
CPC .... E21B 47/117; E21B 47/002; E21B 47/103; E21B 47/113; G06K 9/6256; G06N 3/08
See application file for complete search history.

(56) References Cited

U.S. PATENT DOCUMENTS

| | | | |
|---|---|---|---|
| 7,358,860 B2 | 4/2008 | Germouni et al. | |
| 7,939,804 B2 | 5/2011 | Schmidt | |
| 2003/0204311 A1* | 10/2003 | Bush ................ | G01V 3/38 |
| | | | 702/13 |

(Continued)

FOREIGN PATENT DOCUMENTS

| | | | | |
|---|---|---|---|---|
| CN | 102680174 | | 9/2012 | |
| CN | 108304682 A | * | 7/2018 | .......... G06F 30/367 |
| WO | WO 2009087614 | | 7/2009 | |

OTHER PUBLICATIONS

"Neural Networks are Decision Trees", Caglar Aytekin, AAC Technologies, published Oct. 25, 2022, https://arxiv.org/pdf/2210.05189.pdf. (Year: 2022).*

*Primary Examiner* — Catherine T. Rastovski
*Assistant Examiner* — Lal C Mang
(74) *Attorney, Agent, or Firm* — Fish & Richardson P.C.

(57) ABSTRACT

In an example method a system obtains first data regarding a first oil well, including one or more first thermal images of the oil well generated by one or more first thermal cameras. The system determines, using computerized neural network, a presence of a gas leak at one or more locations on the first oil well based on the first data. The one or more locations include at least one of a first location along a pipeline configured to convey gas to a flare area of the first oil well, or a second location at a rig floor of the first oil well. In response to determining the presence of the gas leak at the one or more locations, the system generates a notification indicating the presence of the gas leak at the one or more locations.

20 Claims, 7 Drawing Sheets

(56) References Cited

U.S. PATENT DOCUMENTS

| | | | |
|---|---|---|---|
| 2006/0220888 A1* | 10/2006 | Germouni | G08B 21/14 165/11.1 |
| 2014/0002667 A1* | 1/2014 | Cheben | G01N 21/3518 348/164 |
| 2016/0201838 A1* | 7/2016 | Flanders | F16L 55/07 137/12 |
| 2017/0010382 A1* | 1/2017 | Mishkhes | E21B 47/00 |
| 2017/0122833 A1 | 5/2017 | Furry | |
| 2019/0169982 A1* | 6/2019 | Hauge | E21B 47/10 |
| 2021/0010645 A1* | 1/2021 | Zhang | G01K 11/322 |
| 2023/0058017 A1* | 2/2023 | Jones | E21B 49/10 |

\* cited by examiner

DETECTING GAS LEAKS IN OIL WELLS USING MACHINE LEARNING

TECHNICAL FIELD

The disclosure relates to systems and methods for detecting gas leaks in oil wells using machine learning.

BACKGROUND

A well is used to bring natural resources, such as oil or natural gas, from a subsurface formation to the surface of the earth. A well can be created and utilized according to several stages, including a drilling stage, a completion stage, and a production stage.

During the drilling stage, a wellbore is formed by drilling a hole through the surface of the earth and through a portion of the subterranean formation, such that the contents of the subterranean formation can be accessed. Further, the wellbore can be reinforced, for example by installing casing or pipe along its length.

During the completion stage, the well is made ready for production or injection. For example, the bottom of the wellbore can be prepared to particular specifications. As another example, production tubing and other downhole tools can be installed in or around the wellbore to facilitate the extraction of natural resources from the well.

During the production stage, natural resources are extracted from the subterranean formation and brought to the surface of the earth. For example, oil or natural gas contained within the subterranean formation can be brought to the surface of the earth, such that they can be processed and used as sources of energy or used as a part of other industrial applications.

SUMMARY

Oil wells can include one or more gas flow lines for conveying gaseous substances from one location to another. As an example, gas flow lines can be used to convey hydrocarbon gas as a part of a hydrocarbon production and/or distribution process.

Further, the gas flow lines of an oil well may susceptible to gas leaks. For example, the material of the gas flow line may chemically react with gaseous substances conveyed by the gas flow line and/or the exterior environment, which may weaken the structural integrity of the gas flow line. If the gas flow line becomes sufficiently corroded, one or more holes, gaps, cracks, or other openings may develop on the gas flow line, from which gaseous substances may leak. As another example, the gas flow line may be subjected to high gas pressures that exceed the containments limits of the gas flow line, which can result in gaseous substances escaping from the gas flow line. As another example, the components of the gas flow line may malfunction, which can also result in gaseous substances escaping from the gas flow line. These leaks may be detrimental to the safety and/or reliability of the gas flow lines.

Machine learning techniques can be used to identify gas leaks in an oil well, such that the gas leaks can be repaired or otherwise mitigated. For example, a computer system can obtain multiple sets of training data, each set including sensor data regarding a previously observed oil well, and an indication whether a gas leak was occurring at that oil well at the time that the sensor data was generated. Based on the training data, the computer system can be trained to recognize characteristics in sensor data regarding a presently observed oil well that are indicative to a gas leak, and notify the user to take appropriate action.

The implementations described in this disclosure can provide various technical benefits. For instance, the machine learning processes described herein enable a computer system to automatically identify gas leaks in an oil well, such that the oil well can be repaired and the gas leak stopped. Accordingly, the oil well can be operated in a safer and more reliable manner.

In an aspect, a method includes obtaining, using one or more processors, first data regarding a first oil well, where the first data includes one or more first thermal images of the oil well generated by one or more first thermal cameras; determining, using the one or more processors implementing a computerized neural network, a presence of a gas leak at one or more locations on the first oil well based on the first data, where the one or more locations include at least one of: a first location along a pipeline configured to convey gas to a flare area of the first oil well, or a second location at a rig floor of the first oil well; and responsive to determining the presence of the gas leak at the one or more locations, generating, using the one or more processors, a notification indicating the presence of the gas leak at the one or more locations.

Implementations of this aspect can include one or more of the following features.

In some implementations, the method can also include, responsive to determining the presence of the gas leak at the one or more locations, modifying an operation of the first oil well.

In some implementations, modifying the operation of the first oil well can include reducing a flow of gas in one or more pipelines of the first oil well.

In some implementations, determining the presence of the gas leak can include differentiating, based on the first data, (i) the presence of the gas leak from (ii) a change in one or more conditions of an ambient environment of the first oil well.

In some implementations, the one or more conditions of the ambient environment of the first oil well can include at least one of: a weather condition of the ambient environment of the first oil well, or a temperature of the ambient environment of the first oil well.

In some implementations, determining the presence of the gas leak can include determining, based on the first data, a first likelihood that the gas leak is present at the one or more locations on the first oil well.

In some implementations, determining the presence of the gas leak can include determining, based on the first data, a second likelihood that the one or more conditions of the ambient environment of the first oil well have changed.

In some implementations, the first data can further include one or more temperature measurements generated by one or more temperature sensors.

In some implementations, the first data can further include one or more wind measurements generated by one or more wind sensors. The one more wind measurements can represent at least one of: an intensity of wind in an environment of the first oil well, or a direction of wind in the environment of the first oil well.

In some implementations, the computerized neural network can be trained based a plurality of sets of training data regarding a plurality of second oil wells. The sets of training data can include, for each of the second oil wells: one or more second thermal images of that second oil well generated by one or more second thermal cameras; and an indication whether a gas leak was present at that second oil well at the time that the one or more second thermal images of that second oil well were generated.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1A:
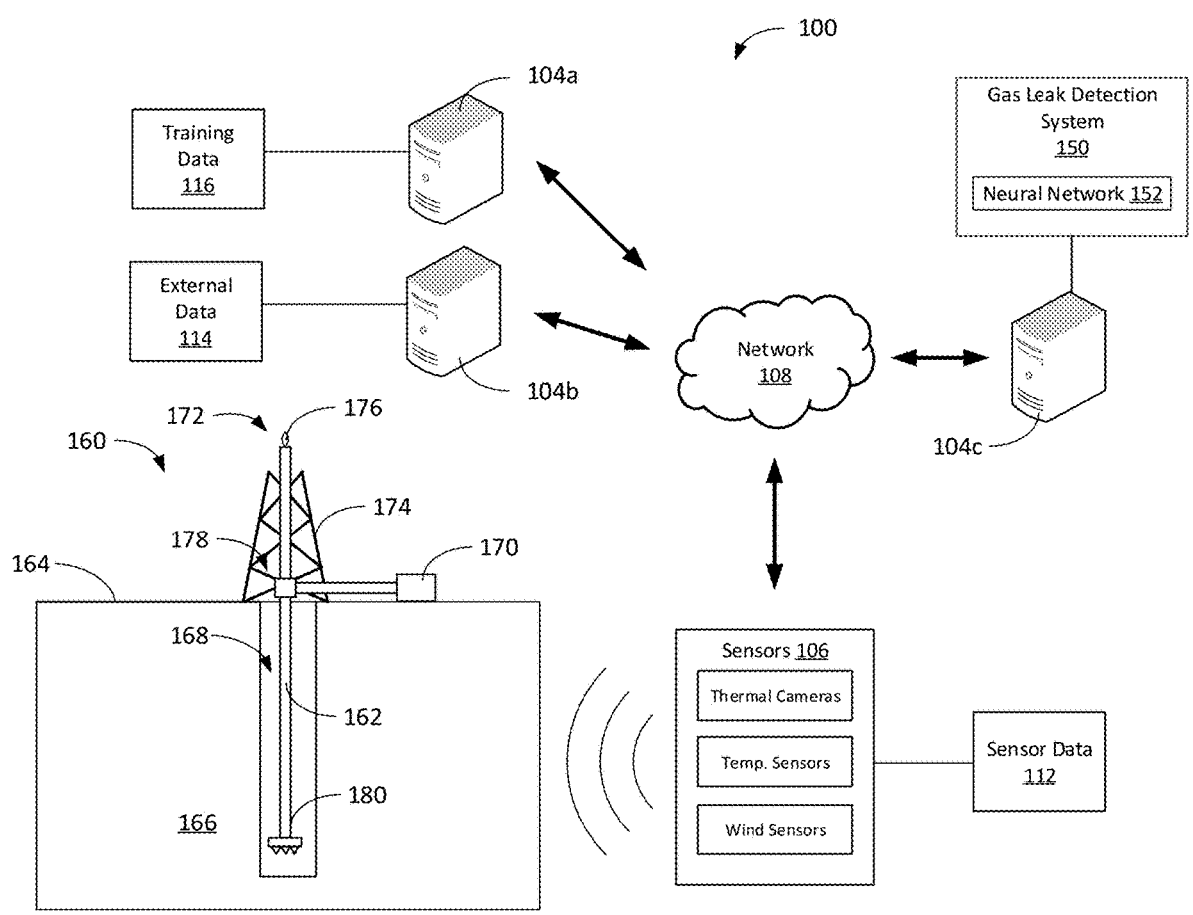
FIG. 1A is a diagram of an example system for detecting gas leaks in an oil well using machine learning.

FIG. 1A shows an example system 100 for detecting gas leaks in an oil well 160. The system 100 includes several computer systems 104a-104c and sensors 106 communicatively coupled to one another through a network 108. Further, a gas leak detection system 150 including a neural network 152 is maintained on at least one of the computer systems (for example, the computer system 104c).

The oil well 160 includes several gas flow lines 162 configured to convey gaseous substances between two or more locations. As an example, the gas flow lines 162 can convey hydrocarbon gas as a part of a hydrocarbon production and/or distribution process. Example hydrocarbon gases include methane ($CH_4$), ethane ($C_2H_6$), propane ($C_3H_8$), butanes ($C_4H_{10}$), pentanes ($C_5H_{12}$), hexane ($C_6H_{14}$), and heptane ($C_7H_{16}$), among others.

At least some of the gas flow lines 162 can include one or more pipelines, tubes, or other conduits for conveying gaseous substances. As an example, a gas flow line 162 can include a tubular body with at least one input aperture and at least one outlet aperture. The gas flow line 162 can receive a gaseous substance via one or more of the input apertures, and convey the gaseous substance to one or more of the output apertures via the tubular body.

Further, at least some of the gas flow lines 162 can be interconnected with one another, such that gaseous substances are conveyed from one or more input apertures of one gas flow line to one or more output apertures of another gas flow line. For example, a network of interconnected gas flow lines 162 can be configured to receive gaseous substances from one or more sources, and convey the gaseous substances to one or more destinations.

In some implementations, one or more gas flow lines 162 can be configured to convey gaseous substances between a surface of the earth 164 and a subterranean location 166. For example, one or more gas flow lines 162 can be positioned in or along a bore hole 168 of the oil well 160, and extend between the surface of the earth 164 and the subterranean location 166. The one or more gas flow lines 162 can be used to extract gaseous substances at the subterranean location 166 to the surface of the earth 164 for collection, such as during a production process. Further, the one or more gas flow lines 162 can be used to introduce gaseous substances to the subterranean location 166, such as during a drilling process.

In some implementations, one of more gas flow lines 162 can be configured to convey gaseous substances along the surface of the earth 164. For example, one or more gas flow lines 162 can extend along the surface of the earth 164, and interconnect oil well 160 with another structure 170. In some implementation, the structure 170 can be configured to receive gaseous substances from the oil well 160. In some implementation, the structure 170 can be configured to provide gaseous substances to the oil well 160. In some implementations, the structure 170 can include one or more storage tanks or other infrastructure for storing and conveying gaseous substances.

In some implementations, one of more gas flow lines 162 can be configured to convey gaseous substances to a flare area 172 of the oil well 160. The flare area 172 of an oil well 160 is configured to perform burn off gaseous substances from the oil well 160, such as those that are produced and/or released during the drilling, completion, and/or production process. As an example, one or more gas flow lines 162 can extend along an exterior platform 174 (for example, a superstructure), and include an exit aperture at or in proximity to a burner 176 atop of the oil well 160. The burner 176 can ignite gaseous substances that are released from the exit aperture of the gas flow lines 162 (for example, by producing a flame), such that the gaseous substances are converted into other products. In some implementations, the flare area 172 can be used to eliminate or otherwise mitigate the release of combustible and/or toxic gases from the oil well 160.

In some implementations, one of more gas flow lines 162 can be configured to convey gaseous substances to and/or from a rig floor 178 of the oil well 160. The rig floor 178 includes a working area of the oil well 160 in which a rig crew conducts operations. In some implementations, the rig floor 178 can into a working area in which operators (for example, a rig crew) add drillpipe to and/or remove drillpipe from a drillstring 180. In some implementations, the rig floor 178 can into a working area in which operators add pipes to and/or remove pipes from a gas flow line 162 that extends to the subterranean location 166.

The general, the gas flow lines 162 may susceptible to gas leaks. For example, the material of the gas flow line may chemically react with gaseous substances conveyed by the gas flow line and/or the exterior environment, which may weaken the structural integrity of the gas flow line. If the gas flow line becomes sufficiently corroded, one or more holes, gaps, cracks, or other openings may develop on the gas flow line, from which gaseous substances may leak. As another example, the gas flow line may be subjected to high gas pressures that exceed the containments limits of the gas flow line, which can result in gaseous substances escaping from the gas flow line. As another example, the components of the gas flow line may malfunction, which can also result in gaseous substances escaping from the gas flow line.

These gas leaks may be detrimental to the safety and/or reliability of the gas flow lines. For example, a gas leak may introduce toxic, reactive, or otherwise dangerous gases into an environment occupied by humans. As another example, a gas leak may reduce the amount of the gaseous substance that is conveyed to a particular destination.

Machine learning techniques can be used to identify gas leaks in the gas flow lines 162, such that the gas leaks can be repaired or otherwise mitigated. For example, the gas leak detection system 150 can obtain multiple sets of training data, each set including (i) sensor data regarding a previously observed oil well, (ii) other data regarding that oil well (for example, data generated by third-party sources), and (iii) an indication whether a gas leak was occurring at that oil well at the time that the sensor data and/or other data was generated. Based on the training data, the gas leak detection system 150 can train a neural network 152 to recognize characteristics in sensor data regarding a presently observed oil well that are indicative of a gas leak. Further, the gas leak detection system 150 can notify a user regarding the gas leak, such as by transmitting one or more alerts to the user.

In some implementations, the neural network 152 can receive data regarding an oil well 160 (for example, sensor data 112 and/or external data 114), and output a metric based on the data. In some implementations, the metric can indicate the likelihood that the oil well 160 currently has a gas leak. In some implementations, the metric can indicate the likelihood that a gas leak will develop in the oil well 160 in the future (for example, within a particular length of time in the future).

As an example, a metric having a high value can indicate that a gas leak is likely present on one or more of the gas flow lines 162. Further, a metric having a low value can indicate that a gas leak is unlikely to be present on one or more of the gas flow lines 162.

As an example, a metric having a high value can indicate that a gas leak is likely to develop on one or more of the gas flow lines 162 in the future (for example, with a particular length of time in the future). Further, a metric having a low value can indicate that a gas leak is unlikely to develop on one or more of the gas flow lines 162 in the future.

In some implementations, the gas leak detection system 150 can warn a user regarding a gas leak, such that appropriate actions can be performed to repair and/or mitigate the gas leak. For instance, if the metric for the oil well 160 exceeds a particular threshold value (for example, indicating that the likelihood of a gas leak is sufficiently high), the gas leak detection system 150 can generate a notification to a user to alert the user of the risk. Further, the gas leak detection system 150 can identify specific portion of the oil well 160 (for example, the specific portion of a gas flow line 162) that is likely to have a gas leak. This technique can be beneficial, for example, in assisting the user in identifying gas leaks in the gas flow lines 162, and repairing and/or maintaining the gas flow lines 162 to improve the safety and/or efficiency of the oil well 160.

In some implementations, the gas leak detection system 150 can automatically perform operations to mitigate the effects of the gas leak. For instance, upon detecting a gas leak in a particular gas flow line 162, the gas leak detection system 150 can automatically reduce and/or stop a flow of gas through that gas flow line 162. As an example, the gas leak detection system 150 can automatically cause a gas valve upstream from the gas leak to narrow or close (for example, by transmitting command signals to a control system that controls the operation of the gas valve).

In some implementations, at least one of the metrics that is output by the neural network 152 can indicate the likelihood that an event other than a gas leak is occurring with respect to the oil well 160. As an example, at least one of the metrics can indicate the likelihood that changes in the sensor data 112 and/or the external data 114 reflect changes in the weather conditions at the location of the oil well 160 (for example, changes in the temperature, wind speed, wind direction, humidity, or any other weather condition), rather than the development of a gas leak. This technique can be useful in reducing the occurrence of false positives by the gas leak detection system 150.

Each of the computer systems 104a-104c can include any number of electronic device that are configured to receive, process, and transmit data. Examples of the computer systems 104a-104c include client computing devices (such as desktop computers or notebook computers), server computing devices (such as server computers or cloud computing systems), mobile computing devices (such as cellular phones, smartphones, tablets, personal data assistants, notebook computers with networking capability), wearable computing devices (such as a smart phone or a headset), and other computing devices capable of receiving, processing, and transmitting data. In some implementations, the computer systems 104a-104c can include computing devices that operate using one or more operating systems (as examples, Microsoft Windows, Apple macOS, Linux, Unix, Google Android, and Apple iOS, among others) and one or more architectures (as examples, x86, PowerPC, and ARM, among others). In some implementations, one or more of the computer system 104a-104c need not be located locally with respect to the rest of the system 100, and one or more of the computer systems 104a-104c can be located in one or more remote physical locations.

Each the computer systems 104a-104c can include a respective user interface that enables users interact with the computer system 104a-104c and the gas leak detection system 150, such as to view data from one or more of the computer systems 104a-104c or the gas leak detection system 150, transmit data from one computer system 104a-104c to another, or to issue commands to one or more of the computer systems 104a-104c or the gas leak detection system 150. Commands can include, for example, any user instruction to one or more of the computer system 104a-104c or the gas leak detection system 150 to perform particular operations or tasks. In some implementations, a user can install a software application onto one or more of the computer systems 104a-104c to facilitate performance of these tasks.

In FIG. 1A, the computer systems 104a-104c are illustrated as respective single components. However, in practice, the computer systems 104a-104c can be implemented on one or more computing devices (for example, each computing device including at least one processor such as a microprocessor or microcontroller). As an example, the computer system 104c can be a single computing device that is connected to the network 108, and the gas leak detection system 150 can be maintained and operated on the single computing device. As another example, the computer system 104c can include multiple computing devices that are connected to the network 108, and the gas leak detection system 150 can be maintained and operated on some or all of the computing devices. For instance, the computer system 104c can include several computing devices, and the gas leak detection system 150 can be distributed on one or more of these computing devices.

The network 108 can be any communications network through which data can be transferred and shared. For example, the network 108 can be a local area network (LAN) or a wide-area network (WAN), such as the Internet. The network 108 can be implemented using various networking interfaces, for instance wireless networking interfaces (such as Wi-Fi, Bluetooth, or infrared) or wired networking interfaces (such as Ethernet or serial connection). The network 108 also can include combinations of more than one network, and can be implemented using one or more networking interfaces.

In general, the gas leak detection system 150 can detect gas leaks in the oil well 160 (for example, along the gas flow lines 162) based on sensor data 112, external data 114, and training data 116.

The sensor data 112 represents one or more properties of the oil well 160 and/or the ambient environment of the oil well 160. In some implementations, the sensor data 112 can be generated by one or more of the sensors 106, and provided to the gas leak detection system 150 in real time or substantially real time.

In some implementations, at least one of the sensors 106 can be a thermal camera that is configured to generate one or more thermal images of the oil well 160. As an example, a thermal camera can include one or more sensors (for example, charge-coupled devices (CCDs) or complementary metal-oxide-semiconductor (CMOS) sensors) that are sensitive to the infrared spectrum. As another example, a thermal camera can include film that is sensitive to the infrared spectrum.

In some implementations, a thermal camera can be positioned and configured such that a field of view of the camera covers an entirely of the oil well 160. In some implementations, a thermal camera can be positioned and configured such that a field of view of the camera covers a portion of the oil well 160, such as a particular gas flow line 160 or a section thereof.

In general, a thermal image can include graphical data that represents infrared radiation emitted from one or more subjects, such as a two dimensional grid of pixels. In some implementations, the color and/or intensity of each pixel in a thermal image can correlate with the intensity of infrared radiation that is emitted from a particular location on a subject. In some implementations, a thermal image may be referred to as an infrared image or a thermogram.

In some implementations, at least one of the sensors 106 can be a temperature sensor that is configured to generate sensor data representing a temperature of one or more components of the oil well 160 (for example, the temperature of one or more of the gas flow lines 162). In some implementations, at least one of the sensors 106 can be a temperature sensor that is configured to generate sensor data representing a temperature of an ambient environment of the oil well 160.

In some implementations, at least one of the sensors 106 can be a wind sensor that is configured to generate sensor data representing a speed and/or direction of wind in an ambient environment of the oil well 160.

Figure 1B:
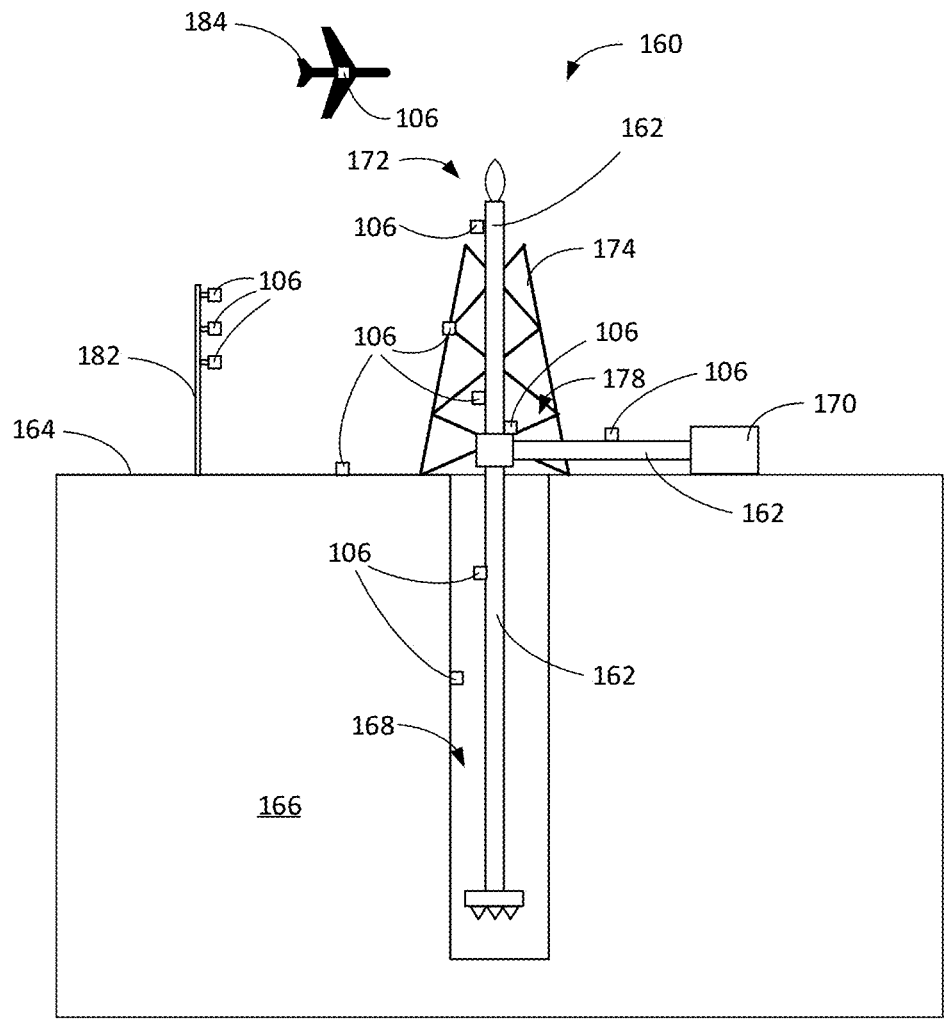
FIG. 1B is a diagram showing example sensor locations in an oil well.

In general, the sensors 106 can be positioned at various locations on the oil well 160, around the oil well 160 and/or in an ambient environment of the oil well 160. Example positions for the sensors 106 are shown in FIG. 1B.

In some implementations, at least some of the sensors 106 can be positioned on or around the gas flow lines 162. For example, one or more of the sensors 106 can be positioned on or around the gas flow lines 162 extending between the surface of the earth 164 and the subterranean location 166. For example, one or more of the sensors 106 can be positioned on or around the gas flow lines 162 extending along the surface of the earth 164. As another example, one or more of the sensors can be positioned on or around the gas flow flows line leading to the flare area 172. As another example, one or more of the sensors can be positioned on the gas flow flows lines on or around the rig floor 178.

In some implementations, at least some of the sensors 106 can be positioned within the bore hole 168. For example, at least some of the sensors 106 can be positioned on a well casing within the bore hole 168.

In some implementations, at least some of the sensors 106 can be positioned on the exterior platform 174, such as on a superstructure of the oil well 160.

In some implementations, at least some of the sensors 106 can be positioned in an ambient environment of the oil well 160. For example, at least some of the sensors 106 can be positioned on the surface of the earth 164 in proximity to the oil well 160. For example, at least some of the sensors 106 can be suspended above the surface of the earth 164, such as on a tower or mast 182.

In some implementations, at least some of the sensors 106 can be positioned on an aircraft 184, such as on an airplane, a helicopter, a drone, and/or a satellite.

The external data 114 includes additional information regarding the oil well 160 and/or the ambient environment of the oil well 160.

As an example, the external data 114 can include weather data regarding the location of the oil well 160, such as the temperature at that location, the intensity (for example, speed) and/or direction of wind at that location, a humidity at that location, precipitation at that location, or any other weather-related information regarding that location. In some implementations, at least some of the external data 114 can be obtained from a remote source, such as a third-party weather service provider.

As an example, the external data 114 can include imaging data regarding the oil well 160 and/or the ambient environment of the oil well 160. As an example, the external data 114 can include satellite images and/or overhead generated by a third-party image provider. In some implementations, the images can include thermal images. In some implementations, the images can include other types of images, such as images of the visible spectrum.

As described above, the gas leak detection system 150 can use training data 116 to train the neural network 152 to recognize characteristics of the oil well 160 that are indicative of a gas leak. As an example, the gas leak detection system 150 can obtain multiple sets of training data 116, each set including (i) sensor data regarding a previously observed oil well, (ii) other data regarding that oil well (for example, data generated by third-party sources), and (iii) an indication whether a gas leak was occurring at that oil well at the time that the sensor data was generated. Further, the gas leak detection system 150 can train the neural network 152 to recognize particular trends, patterns, or correlations between the characteristics of the properties of the previously observed of wells, and the presence or absence of gas leaks in those oil wells. Example training data and training techniques are described in further detail below.

The data in each set of training data 116 can be similar to the sensor data 112 and/or the external data 114 described above. For instance, each set of training data 116 can include sensor data regarding a respective previously observed oil well, such as one or more thermal images of that oil well, temperature measurements of the oil well, temperature measurements of an ambient environment of the oil well, and/or wind measurements of an ambient environment of the oil well, or any other sensor data. Further, each set of training data 116 can include external data regarding a respective previously observed oil well, data regarding the weather at the location of that oil well, imaging data regarding that oil well, or any other information regarding that oil well.

Further, each set of training data can indicate whether a gas leak was present in a respective previously observed gas flow line at the time that the sensor data and/or external data was obtained, and if so, the location of that gas leak. In some implementations, each set of training data can also indicate whether gas leak developed after the sensor data and/or the external data was obtained, and if so, the location of that gas leak. In some implementations, at least some of the data regarding gas leaks (or lack thereof) in the oil well can be based on a user's inspections of a respective oil well, such as a user's inspection of the oil well's gas flow lines.

Figure 2:
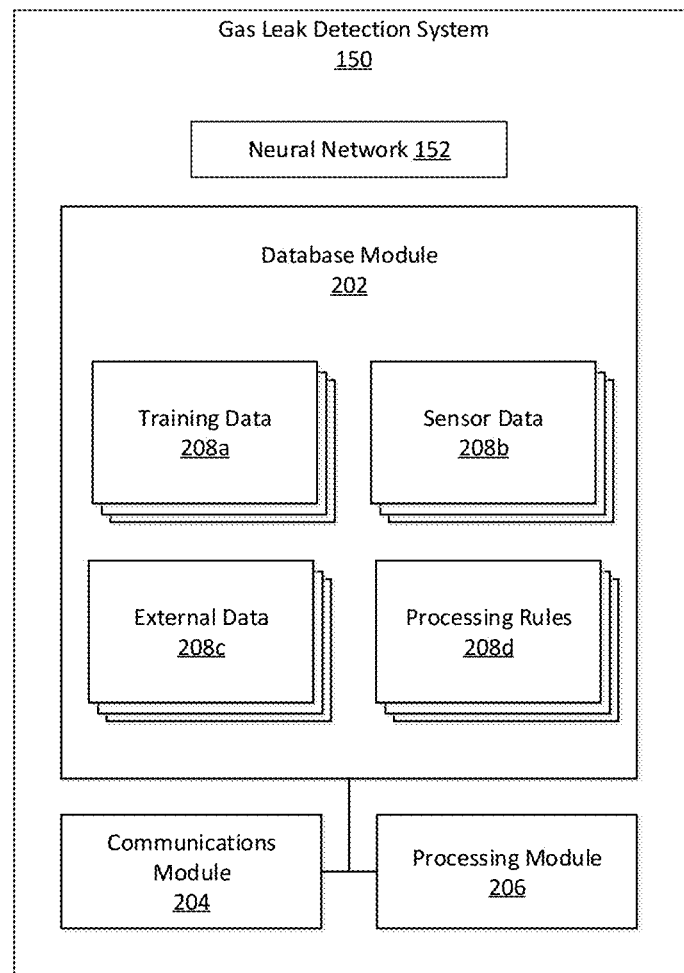
FIG. 2 is a diagram of an example gas leak detection system.

FIG. 2 shows various aspects of the gas leak detection system 150. The gas leak detection system 150 includes a neural network 152 and several modules that perform particular functions related to the operation of the system 100. For example, the gas leak detection system 150 can include a database module 202, a communications module 204, and a processing module 206.

The database module 202 maintains information related to detecting gas leaks in the oil well 160 using the neural network 152. As an example, the database module 202 can store training data 208a that is used to train the neural network 152 to detect gas leaks in the oil well 160 (in one of more of the gas flow lines 162). The training data 208a can include historical information regarding one or more previously observed oil wells and information regarding whether a gas leak develop in those oil wells. In some implementations, the training data 208a can be similar to the training data 116 described with reference to FIG. 1A.

Further, the database module 202 can store sensor data 208b and external data 208c for use in detecting gas leaks in one or more presently observed oil wells. As an example, the sensor data 208b and the external data 208c can include the sensor data 112 and/or the external data 114, respectively, described with reference to FIG. 1A.

Further, the database module 202 can store processing rules 208d specifying how data in the database module 202 can be processed to train a neural network 152 to detect gas leaks in the oil well 160. For instance, the processing rules 208d can specify how the training data 208a is used by the gas leak detection system 150 to train a neural network 152 to detect gas leaks in the gas flow lines 162 based on the sensor data 208b and the external data 208c.

For example, the processing rules 208d can specify one more machine learning or artificial intelligence processes for identifying patterns, trends, or correlations in the input data that indicate that a gas leak is present in the oil well 160 or is likely to develop in the oil well 160 in the future. As another example, the processing rules 208d can specify that at least a portion of the training data 208a be used as input data in the machine learning or artificial intelligence processes (for example, to provide "ground truth" examples that can aid in the identification of patterns or trends). Accordingly, the gas leak detection system 150 can be trained to detect gas leaks in newly observed oil wells based on information regarding previously observed oil wells. In some implementations, the processing rules 208d can specify that the neural network 152 be iteratively trained and re-trained with successive sets of training data 208a (for example, additional sets of training data 208a that are collected over time) to progressively improve its accuracy in detecting gas leaks in oil wells. In some implementations, the processing rules 208d can specify that a training process be performed automatically by the gas leak detection system 150 without manual user input.

As another example, the processing rules 208d can specify that the neural network 152 receives the sensor data 208b and the external data 208c, and outputs one or more metrics based on the sensor data 208b and the external data 208c. As described above, at least one of the metrics can indicate the likelihood that an oil well and/or component thereof corresponding to the sensor data 208b and the external data 208c is leaking gas and/or the likelihood that the oil well or component thereof will develop a gas leak in the future.

In some implementations, the processing rules 208d can specify that the neural network 152 output a single metric that represents the oil well 160 as a whole. In some implementations, the processing rules 208d can specify that the neural network 152 output multiple metrics. At least some of the metrics can correspond to different ones of the gas flow lines 162. Further, at least some of the metrics can corresponding to different portions or sections of the gas flow lines 162.

As described above, at least one of the metrics can indicate the likelihood that an event other than a gas leak is occurring with respect to the oil well 160. As an example, at least one of the metrics can indicate the likelihood that changes in the sensor data 112 and/or the external data 114 reflect changes in the weather conditions at the location of the oil well 160 (for example, changes in the temperature, wind speed, wind direction, humidity, or any other weather condition), rather than the development of a gas leak. This technique can be useful in reducing the occurrence of false positives by the gas leak detection system 150. For example, changes in the weather conditions at the location of the oil well 160 may result in corresponding changes in the data generated by the thermal cameras, the temperature sensors, and/or the wind sensors positioned at that location. Further, changes in the weather conditions at the location of the oil well 160 may also result in corresponding changes in the weather data and/or imaging data generated by third party sources. Based the processing rules 208d, the neural network 152 can be trained and use to differentiate between gas leaks and other events.

Example machine learning or artificial intelligence process are described in further detail below.

In some implementations, the processing rules 208d can specify that the gas leak detection system 150 warns a user regarding the presence of a gas leak or the risk of a future gas leak. For instance, the processing rules 208d can specify that if a metric corresponding to a particular gas flow line 162 exceeds a first threshold value (for example, indicating that the likelihood that a gas leak is present on the gas flow line and/or will develop on the gas flow line is sufficiently high), in response, the gas leak detection system 150 will generate a notification to a user to warn the user of the risk. Further, the gas leak detection system 150 can identify specific gas flow line 160 that is at risk.

In some implementations, the processing rules 208d can specify that the gas leak detection system 150 automatically perform operations to mitigate the effects of a gas leak. For instance, the processing rules 208d can specify if a metric corresponding to a particular gas flow line 162 exceeds a first threshold value (for example, indicating that the likelihood that a gas leak is present on the gas flow line and/or will develop on the gas flow line is sufficiently high), in response, the gas leak detection system 150 will automatically cause a gas valve upstream from the gas leak to narrow or close (for example, by transmitting command signals to a control system that controls the operation of the gas valve).

As described above, the gas leak detection system 150 also includes a communications module 204. The communications module 204 allows for the transmission of data to and from the gas leak detection system 150. For example, the communications module 204 can be communicatively connected to the network 108, such that it can transmit data to and receive data from each of the computer systems 104a-104c and the sensors 106. Information received from the computer systems 104a-104c and sensors 106 can be processed (for example, using the processing module 206) and stored (for example, using the database module 202).

Further, the communications module 204 can generate a notification to one or more users regarding the detect gas leaks or a risk of gas leaks in the oil well 160. As an example, the communications module can generate one or more e-mails, chat messages, text messages (for example, Short Message Service messages), voice messages, video messages, audio messages, and/or any other notification, and transmit that notification to a communications device of a user (for example, via the communications network 108). Example communications devices include network-enabled client computing devices, server computing devices, mobile computing devices, wearable computing devices, telephones, pagers, beepers, or any other computing device capable of receiving and/or transmitting data.

In some implementations, the notification can indicate that a particular gas flow line 162 and/or a particular portion of a gas flow line 162 is leaking gas or is predicted to develop a gas leak in the future (for example, within a particular length of time in the future). Further, the notification can specifically identify those gas flow line 162 and/or those portions of a gas flow line 162.

Further, the communications module 204 can generate command signals to control one or more components of the oil well 160. As an example, the communications module can generate one or more command signals to control the flow of gas through the gas flow lines 162. In some implementations, the command signals can be transmitted to a control system that controls the operation of one or more gas valves positioned along the gas flow lines 162.

As described above, the gas leak detection system 150 also includes a processing module 206. The processing module 206 processes data stored or otherwise accessible to the gas leak detection system 150. For instance, the processing module 206 can generate and train the neural network 152 to detect gas leaks in the oil well 160, given particular training data 208a and processing rules 208d. Further, the processing module 206 can determine a likelihood that a gas leak is present in the oil well 160 and/or a component thereof (or that a gas leak is likely to develop in the future), based on the neural network 152 and given particular sensor data 208b and external data 208c.

Further, the processing module 206 can modify the neural network 152 based the training data 208a and the processing rules 208d. For example, as described above, the processing module 206 can perform one or more machine learning or artificial intelligence processes to identify patterns, trends, or correlations in input data that indicate the presence of a gas leak and/or a future development of a gas leak. The identified patterns, trends, or correlations can be used to generate or modify one or more of the processing rules 208d for generating and updating the neural network 152 (for example, to distinguish between different sets of input data and predicted risks). Further, as described above, at least a portion of the training data 208a can be used as input data in the machine learning or artificial intelligence processes. Further, as described above, the processing module 206 can perform the training processes iteratively using successive sets of training data 208a to progressively improve the neural network's accuracy in detect present gas leaks and/or future gas leaks in the oil well 160. In some implementations, this training process can be performed automatically by the processing module 206 without manual user input.

In some implementations, a software application can be used to facilitate performance of the tasks described herein. As an example, an application can be installed one or more of the computer systems 104a-104c. Further, a user can interact with the application to input data and/or commands to the gas leak detection system 150, and review data generated by the gas leak detection system 150.

In some implementations, the application can present a dashboard user interface (for example, a graphical user interface) that includes information regarding one or more of the gas flow lines 162 and/or the oil well 160. As an example, the user interface can identify each of the gas flow lines 162 that are being monitored by the gas leak detection system 150. As another example, for each of the gas flow lines 162, the user interface can indicate a whether a gas leak has been detected for that gas flow line 162, and if so, the location of the gas leak.

In some implementations, the user interface can present information regarding several gas flow lines 162 concurrently. Further, the user interface can enable a user to select one or more of the gas flow lines 162, and retrieve more detailed information regarding the selected gas flow lines 162. This can be beneficial, for example, as it enables the user to oversee several gas flow lines concurrently, while also enabling the user to evaluate a particular gas flow line in greater detail as desired. For instance, the user interface can present a "summary view" showing the statuses of several gas flow lines 162 concurrently. Further, a user can select a particular gas flow line to view detailed information regarding the selected flow line, such as whether a gas leak has been detected for the gas flow line (and if so, the location of that gas leak), and/or a risk that a gas leak will develop in the gas flow line in the future.

As described above, the gas leak detection system 150 can generate a notification to one or more users regarding the detect gas leaks or a risk of gas leaks in the oil well 160. In some implementations, the application can be used to generate and present at least some notifications to a user. For example, the application can be configured to present graphical, auditory, and/or textual content to indicate any of the information described herein. For instance, the application can identify one or more particular gas flow lines 162 that are leaking gas or are at risk of leaking gas. Further, the application can identify the location of the gas leak and/or the predicted gas leak.

In some implementations, the application can enable a user to customize the manner in which notifications are generated and presented. As an example, the application can enable a user to specify one or more recipients for notifications, and the types of notifications that are used to contact each of those recipients (for example, e-mails, chat messages, text messages, voice messages, video messages, audio messages, or any other type of notification).

Figure 3:
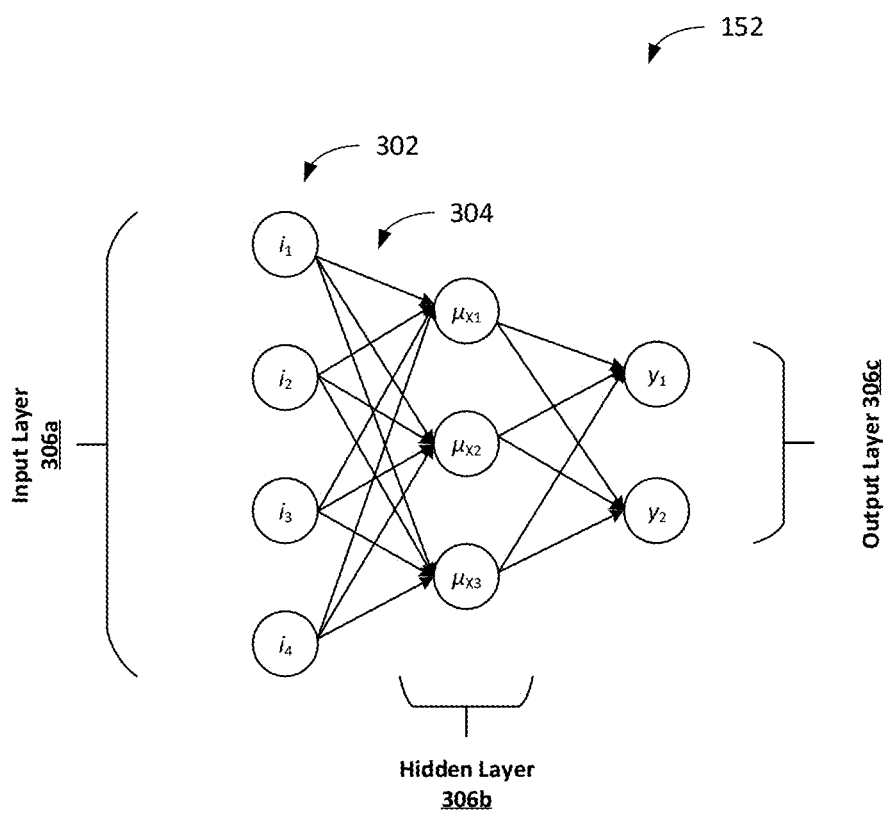
FIG. 3 is a diagram of an example neural network.

As described above, a machine learning process can be performed using one or more neural networks 152. A simplified example of a neural network 152 is shown in FIG. 3.

The neural network 152 includes several nodes 302 (often called "neurons") interconnected with another by interconnections 304. Further, the nodes 302 are arranged according to multiple layers, including an input layer 306a, a hidden layer 306b, and an output layer 306c. The arrangement of the nodes 302 and the interconnections 304 between them represent a mathematical transformation of input data (for example, as received by the nodes of the input layer 306a) into corresponding output data (for example, as output by the nodes of the output layer 306c). In some implementations, the input data can represent one or more data points obtained by the gas leak detection system 150, and the output data can represent one or more corresponding metrics or predictions generated by the gas leak detection system 150 based on the input data.

The nodes 302 of the input layer 306a receive input values and output the received input values to respective nodes of the next layer of the neural network 152. In this example, the neural network 152 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (for example, as indicated by the interconnections 304).

In some implementations, at least some of the information stored by the database module (for example, the sensor data 208b and external data 208c) can be used as inputs for the nodes of the input layer 306a. For example, at least some of the information stored by the database module can be expressed numerically (for example, assigned a numerical score or value), and input into the nodes of the input layer 306a.

The nodes of the hidden layer 306b receive input values (for example, from the nodes of the input layer 306a or nodes of other hidden layers), applies particular transformations to the received values, and outputs the transformed values to respective nodes of the next layer of the neural network 152 (for example, as indicated by the interconnections 304). In this example, the neural network 152 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 306b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n}(weight_i * input_i) + bias,$$

where $weight_i$ is the weight that is applied to an input $input_i$, bias is a bias or offset value is that is applied to the sum of the weighted inputs, and Y is the output of the node.

The nodes of the output layer 306c receive input values (for example from the nodes of the hidden layer 306b) and output the received values. In some implementations, nodes of the output layer 306c can also receive one or more input values, and transform the one or more received values according to a mathematical transfer function (for example, in a similar manner as the nodes of the hidden layer 306b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, at least one of the nodes of the output layer 306c can correspond to a metric that indicates the likelihood that one or more gas flow lines 162 are leaking (or will develop a leak) given particular input data regarding those gas flow lines. As an example a metric having a high value can indicate that a particular gas flow line 162 is likely to be leaking (or likely to develop a leak), whereas a metric having a low value can indicate that the gas flow line 162 is not likely to be leaking (or not likely to develop a leak).

In some implementations, at least one of the nodes of the output layer 306c can correspond to a metric that indicates the likelihood that an event other than a gas leak is occurring with respect to the oil well 160, set as a change in weather. As an example a metric having a high value can indicate that the inputs to the neural network 152 are likely indicative of change in weather at a location of the oil well 160 (for example, rather than a gas leak), whereas a metric having a low value can indicate that the inputs to the neural network 152 are not likely indicative of change in weather at a location of the oil well 160.

In this example, the neural network 152 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 152.

Although FIG. 3 shows example nodes and example interconnections between them, this is merely an illustrative example. In practice, a neural network can include any number of nodes that are interconnected according to any arrangement. Further, although FIG. 3 shows a neural network 152 having a single hidden layer 306b, in practice, a network can include any number of hidden layers (for example, one, two, three, four, or more), or none at all.

Figure 4:
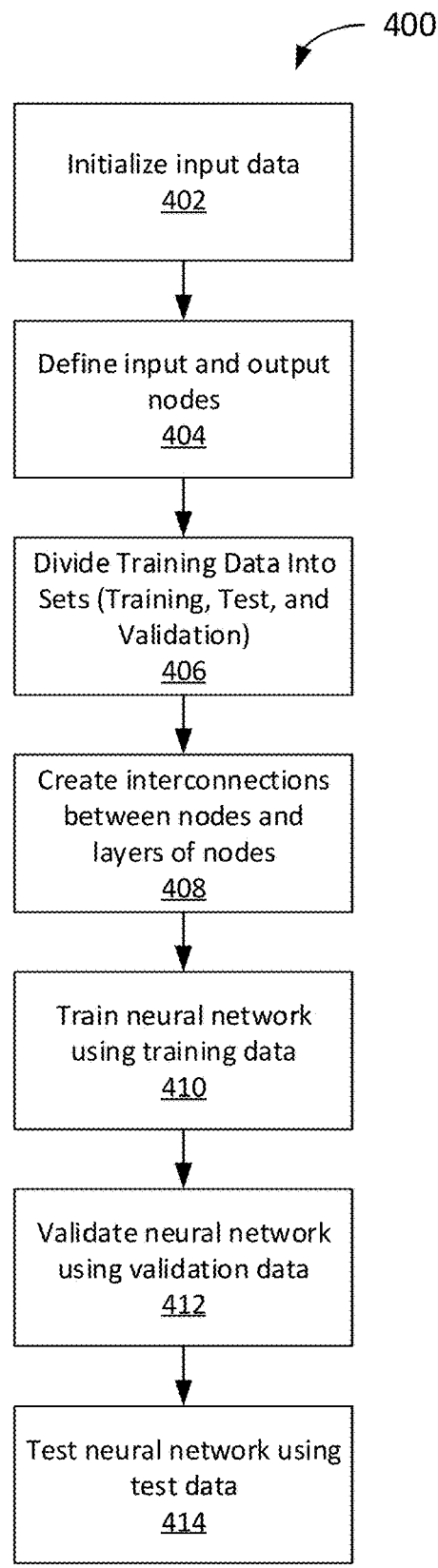
FIG. 4 is a flow chart diagram of an example process for training a neural network.

In some implementations, the neural network 152 can be trained based on training data, such as the training data 208a stored in the database module 202. An example process 400 for training the neural network 152 is shown in FIG. 4.

According to the process 400, the gas leak detection system 150 initializes the input data that is used to train the neural network 152 (block 402). As an example, the gas leak detection system 150 can retrieve at least a portion of the training data 208a, as described above.

Further, the gas leak detection system 150 defines the input and the output nodes of the neural network 152 (block 404). For example, the gas leak detection system 150 can select one or more of the types of data include in the training data 208a (for example, as described above), and specify that they be used as respective input nodes in the neural network 152 (for example, as inputs for respective nodes of the input layer 306a). As another example, the gas leak detection system 150 can specify each of the outputs of the neural network (for example, the outputs of each of the nodes of the output layer 306c). For instance, at least one of the nodes of the output layer 306c can correspond to the likelihood that a particular gas flow line 162 or portion thereof is leaking (or will develop a leak).

The gas leak detection system 150 divides the training data 208a into different sets (block 406). For example, the training data 208a can be divided into a training set, a validation set, and a test set.

The training set can be used to train the neural network 152. For example, the training set can be used to identify patterns, trends, or correlations between the inputs and the outputs of the neural network 152, and to express those relationships using the nodes and interconnections between them.

The validation set can be used to tune the performance of the trained neural network 152. For example, the validation set can be used to determine a difference between the output of the neural network 152 given certain inputs, and an expected output. The configuration of the neural network can be modified based on the different (for example, such that the output of the neural network 152 better matches the expected result).

The test set can be used to evaluate the performance of the trained neural network 152 (for instance, after it has been tuned based on the validation set). For example, the test set can be used to determine a difference between the output of the neural network 152 given certain inputs, and an expected output. This difference can indicate the ability of the neural network 152 to accurately predict a particular outcome (for example, likelihood that a particular gas flow line 162 is leaking or will develop a leak) given particular inputs (for example, particular sensor data and/or external data).

Further, the gas leak detection system 150 creates interconnections between the nodes and layers of nodes in of the neural network 152 (block 408). In some implementations, an interconnection between two or more nodes can be in the forward direction (for example, data can be passed between nodes in the direction of the input to the output of the neural network 152). This may be referred to as a "feed forward" interconnection. In some implementations, an interconnection between two or more nodes can be in the backward direction (for example, data can be passed between nodes in the direction of the output to the input of the neural network 152). This may be referred to as a "back propagation" interconnection.

Further, the gas leak detection system 150 creates layers of nodes. For example, the gas leak detection system 150 can specify that the neural network include N layers of nodes, such as one input layer, one output layer, and N−2 hidden layers. Other arrangements of layers are also possible, depending on the implementation.

Further, the gas leak detection system 150 trains the neural network 152 using the training set (block 410). In some implementations, the gas leak detection system 150 can perform the training based on a supervised learning method. As an example, the training set can include example input data and output data. Based on the arrangement of the nodes and the interconnections between them, the gas leak detection system 150 can identify transfer functions for each of the nodes that would result in the output of the neural network 152 matching or otherwise being similar to the output data in the training set, given the same input data. In some implementations, the gas leak detection system 150 can select particular weights or biases for each of the transfer functions. In some implementations, this can be performed iteratively (for example, using successive sets of training data).

After training the neural network 152, the gas leak detection system 150 validates the neural network 152 using the validation set (block 412). As an example, the validation set can include example input data and output data. The gas leak detection system 150 can input the input data into the neural network 152, and compare the output of the neural network 152 to the output data of the validation set. In some implementations, the gas leak detection system 150 can calculate an "error" of the neural network 152, such as the difference between the output data of the validation set and the output of the neural network 152.

In some implementations, the gas leak detection system 150 can tune the neural network 152 based on the validation set. For example, the gas leak detection system 150 can modify the arrangement of the nodes, the interconnections between them, and/or the transfer functions (for example, the weights and biases) such that the error of the neural network 152 is reduced.

In some implementations, this can be performed iteratively (for example, using successive sets of validation data) until particular criteria are met. For example, in some implementations, the gas leak detection system 150 can iteratively tune the neural network 152 until the error of the neural network 152 is less than a particular threshold value. As another example, the gas leak detection system 150 can iteratively tune the neural network 152 until the neural network 152 exhibits a sufficiently low false positive rate (for example, the rate in which it predicts that a leak is present and/or will develop, when in fact a leak is not present and/or will not develop) and/or a sufficiently low false negative rate (for example, the rate in which it predicts that a leak is not present and/or will not develop, when in fact a leak is present and/or will develop).

After training and tuning the neural network 152, the gas leak detection system 150 tests the neural network 152 using the test set (block 414). As an example, the test set can include example input data and output data. The gas leak detection system 150 can input the input data into the neural network 152, and compare the output of the neural network 152 to the output data of the test set. In some implementations, the gas leak detection system 150 can calculate an "error" of the neural network 152, such as the difference between the output data of the test set and the output of the neural network 152. This error can represent the predictive performance of the neural network 152. For example, a high error can indicate that the neural network 152 is not likely to predict an outcome accurately, given certain input data. Conversely, lower error can indicate that the neural network 152 is likely to predict an outcome accurately, given certain input data.

In some implementations, the metric can be categorized into different discrete levels of severity. For example, if the metric for a particular for a particular gas flow line 162 is less than a first threshold value, the metric for that gas flow line 162 can be categorized as a "low" severity level (for example, indicating a low risk of a gas leak). As another example, if the metric for a gas flow line 162 is greater than or equal to the first threshold value and less than a second threshold value, the metric for that gas flow line 162 can be categorized as a "medium" severity level (for example, indicating a moderate risk of a gas leak). As another example, if the metric for a gas flow line 162 is greater than or equal to the second threshold value and less than a third threshold value, the metric for that gas flow line 162 can be categorized as a "high" severity level (for example, indicating a high risk of a gas leak).

Although example categories are described above, these are merely illustrative examples. In practice, a metric can be categorized according to any number and/or distribution of severity levels.

Further, although example neural networks are provided, other types of machine learning system can be used to implement some or all of the techniques described herein, either instead of our in addition to neural networks. Example machine learning systems include decision tree systems, support-vector machines, regression analysis systems, Bayesian networks, and genetic algorithms, among others.

Further still, although the examples described above pertain to detecting gas oils in oil wells, in practice, the systems and techniques described above can be used to detect gas leaks in any type of well. As an example, the systems and techniques described above also can be used to detect gas leaks in gas wells (for example, wells for extracting natural gas from a subterranean formation to the surface of the earth).

Example Processes

Figure 5:
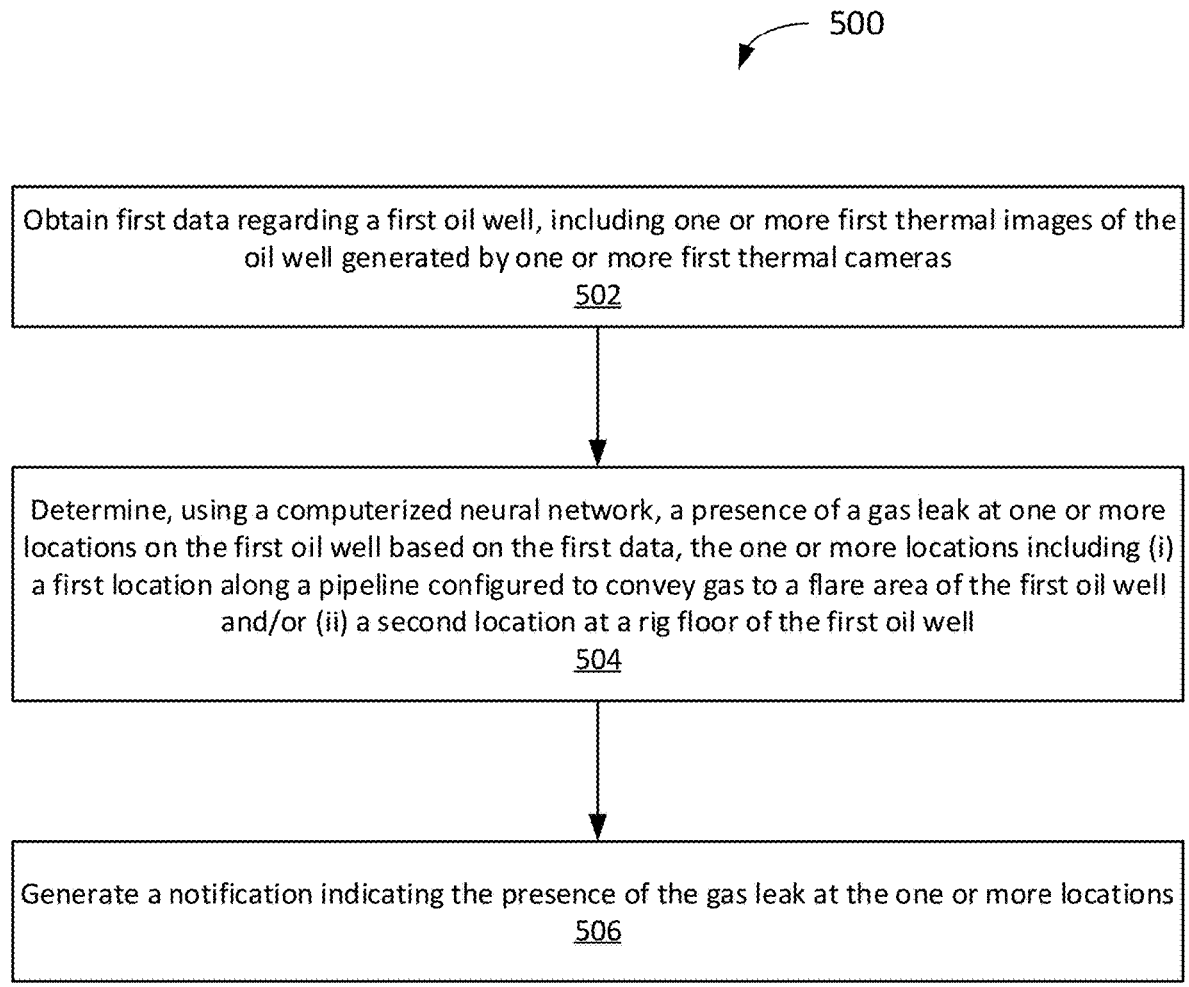
FIG. 5 is a flow chart diagrams of an example process for detecting gas leaks in an oil well using machine learning.

FIG. 5 shows an example process 500 for detecting gas leaks in oil wells using machine learning. In some implementations, the process 500 can be performed by the system 100 described in this disclosure (for example, the system 100 including the gas leak detection system 150 shown and described with reference to FIGS. 1A, 1B, and 2) using one or more processors (for example, using the processor or processors 610 shown in FIG. 6).

In the process 500, a system obtains first data regarding a first oil well (block 502). The first data includes one or more first thermal images of the oil well generated by one or more first thermal cameras. As an example, the system can generate one or more thermal images using one or more thermal cameras of the sensors 106, as described with reference to FIGS. 1A and 1B.

In some implementations, the first data can also include one or more temperature measurements generated by one or more temperature sensors. As an example, the system can generate one or more thermal measurements using images using one or more temperature sensors of the sensors 106, as described with reference to FIGS. 1A and 1B.

In some implementations, the first data can also include one or more wind measurements generated by one or more wind sensors, such as an intensity of wind in an environment of the first oil well and/or a direction of wind in the environment of the first oil well. As an example, the system can generate one or more wind measurements using images using one or more wind sensors of the sensors 106, as described with reference to FIGS. 1A and 1B.

Further, the system determines, using a computerized neural network, a presence of a gas leak at one or more locations on the first oil well based on the first data (block 504). The one or more locations include (i) a first location along a pipeline configured to convey gas to a flare area of the first oil well and/or (ii) a second location at a rig floor of the first oil well. An example flare area 172 and an example rig floor 178 are described with reference to FIGS. 1A and 1B.

In some implementations, determining the presence of the gas leak can include differentiating, based on the first data, (i) the presence of the gas leak from (ii) a change in one or more conditions of an ambient environment of the first oil well. The one or more conditions of the ambient environment of the first oil well can include (i) a weather condition of the ambient environment of the first oil well and/or (ii) a temperature of the ambient environment of the first oil well.

In some implementations, determining the presence of the gas leak include determining, based on the first data, a first likelihood that the gas leak is present at the one or more locations on the first oil well. Further, determining the presence of the gas leak include determining, based on the first data, a second likelihood that the one or more conditions of the ambient environment of the first oil well have changed.

In response to determining the presence of the gas leak at the one or more locations, the system generates a notification indicating the presence of the gas leak at the one or more locations (block 506). As an example, the system can generate one or more e-mails, chat messages, text messages (for example, Short Message Service messages), voice messages, video messages, audio messages, and/or any other notification, and transmit that notification to a communications device of a user.

In some implementations, the system can also modify an operation of the first oil well (for example, in response to determining the presence of the gas leak at the one or more locations, modifying an operation of the first oil well). As an example, the system can reduce a flow of gas in one or more pipelines of the first oil well.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and the gas leak detection system 150 can be implemented using digital electronic circuitry, or in computer software, firmware, or hardware, or in combinations of one or more of them. In another example, the process 500 shown in FIG. 5 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 6:
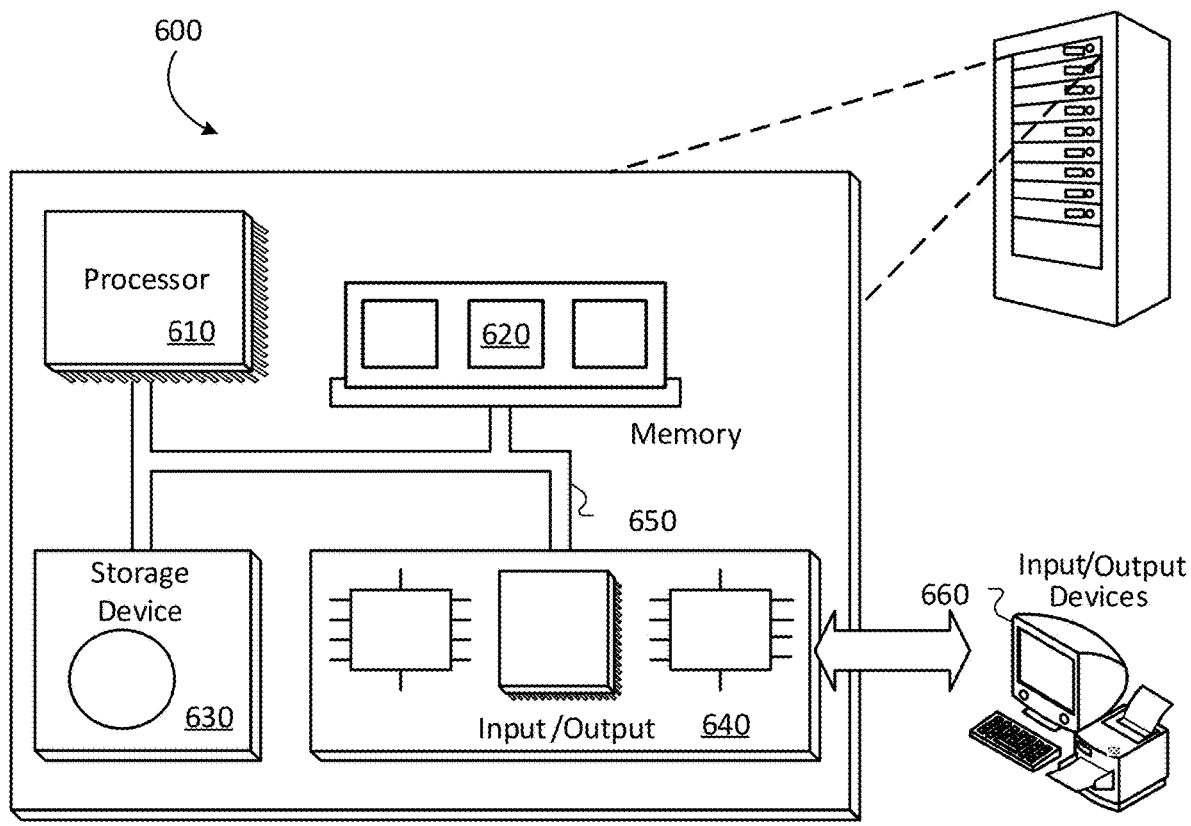
FIG. 6 is a schematic diagram of an example computer system.

FIG. 6 shows an example computer system 600 that includes a processor 610, a memory 620, a storage device 630 and an input/output device 640. Each of the components 610, 620, 630 and 640 can be interconnected, for example, by a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
obtaining, using one or more processors, first data regarding a first oil well, wherein the first data comprises one or more first thermal images of the oil well generated by one or more first thermal cameras;
determining, using the one or more processors implementing a computerized neural network, a presence of a gas leak at one or more locations on the first oil well based on the first data, wherein the one or more locations comprise at least one of:
a first location along a pipeline configured to convey gas to a flare area of the first oil well, or
a second location at a rig floor of the first oil well; and
responsive to determining the presence of the gas leak at the one or more locations, generating, using the one or more processors, a notification indicating the presence of the gas leak at the one or more locations,
wherein the computerized neural network comprises a plurality of interconnected nodes, including:
a plurality of input nodes,
a plurality of output nodes, and
a plurality of weighted nodes interconnecting the plurality of input nodes and the plurality of output nodes,
wherein the computerized neural network is trained to determine one or more transfer functions, wherein the one or more transfer functions define a relationship between the plurality of input nodes and the plurality of output nodes according to the plurality of weighted nodes,
wherein at least some of the input nodes of the computerized neural network corresponds to the first data,
wherein at least one of the output nodes of the computerized neural network corresponds to a first likelihood that the gas leak is present at the one or more locations on the first oil well, and
wherein at least another one of the output nodes of the computerized neural network corresponds to a second likelihood that one or more conditions of an ambient environment of the first oil well have changed.

2. The method of claim 1, further comprising:
responsive to determining the presence of the gas leak at the one or more locations, modifying an operation of the first oil well.

3. The method of claim 2, wherein modifying the operation of the first oil well comprises:
reducing a flow of gas in one or more pipelines of the first oil well.

4. The method of claim 1, wherein determining the presence of the gas leak comprises:
differentiating, based on the first data, (i) the presence of the gas leak from (ii) a change in the one or more conditions of the ambient environment of the first oil well.

5. The method of claim 4, wherein the one or more conditions of the ambient environment of the first oil well comprises at least one of:
a weather condition of the ambient environment of the first oil well, or
a temperature of the ambient environment of the first oil well.

6. The method of claim 1, wherein determining the presence of the gas leak comprises:
determining, based on the first data and the computerized neural network, the first likelihood that the gas leak is present at the one or more locations on the first oil well.

7. The method of claim 6, wherein determining the presence of the gas leak comprises:
determining, based on the first data and the computerized neural network, the second likelihood that the one or more conditions of the ambient environment of the first oil well have changed.

8. The method of claim 1, wherein the first data further comprises:
one or more temperature measurements generated by one or more temperature sensors.

9. The method of claim 1, wherein the first data further comprises:
one or more wind measurements generated by one or more wind sensors, wherein the one or more wind measurements represents at least one of:
an intensity of wind in an environment of the first oil well, or
a direction of wind in the environment of the first oil well.

10. The method of claim 1, wherein the computerized neural network is trained based a plurality of sets of training data regarding a plurality of second oil wells, wherein the sets of training data comprise, for each of the second oil wells:
one or more second thermal images of that second oil well generated by one or more second thermal cameras; and
an indication whether a gas leak was present at that second oil well at the time that the one or more second thermal images of that second oil well were generated.

11. A system comprising:
one or more processors; and
one or more non-transitory computer readable media storing instructions that, when executed by the one or more processors, cause the one or more processors to perform operations comprising:
obtaining first data regarding a first oil well, wherein the first data comprises one or more first thermal images of the oil well generated by one or more first thermal cameras;
determining, using a computerized neural network, a presence of a gas leak at one or more locations on the first oil well based on the first data, wherein the one or more locations comprise at least one of:
a first location along a pipeline configured to convey gas to a flare area of the first oil well, or
a second location at a rig floor of the first oil well; and
responsive to determining the presence of the gas leak at the one or more locations, generating a notification indicating the presence of the gas leak at the one or more locations,
wherein the computerized neural network comprises a plurality of interconnected nodes, including:
a plurality of input nodes,
a plurality of output nodes, and
a plurality of weighted nodes interconnecting the plurality of input nodes and the plurality of output nodes,
wherein the computerized neural network is trained to determine one or more transfer functions, wherein the one or more transfer functions define a relationship between the plurality of input nodes and the plurality of output nodes according to the plurality of weighted nodes,
wherein at least some of the input nodes of the computerized neural network corresponds to the first data, wherein at least one of the output nodes of the computerized neural network corresponds to a first likelihood that the gas leak is present at the one or more locations on the first oil well, and wherein at least another one of the output nodes of the computerized neural network corresponds to a second likelihood that one or more conditions of an ambient environment of the first oil well have changed.

12. The system of claim 11, the operations further comprising:

responsive to determining the presence of the gas leak at the one or more locations, modifying an operation of the first oil well.

13. The system of claim 12, wherein modifying the operation of the first oil well comprises:

reducing a flow of gas in one or more pipelines of the first oil well.

14. The system of claim 11, wherein determining the presence of the gas leak comprises:

differentiating, based on the first data, (i) the presence of the gas leak from (ii) a change in the one or more conditions of the ambient environment of the first oil well.

15. The system of claim 14, wherein the one or more conditions of the ambient environment of the first oil well comprises at least one of:

a weather condition of the ambient environment of the first oil well, or a temperature of the ambient environment of the first oil well.

16. The system of claim 11, wherein determining the presence of the gas leak comprises:

determining, based on the first data and the computerized neural network, the first likelihood that the gas leak is present at the one or more locations on the first oil well.

17. The system of claim 16, wherein determining the presence of the gas leak comprises:

determining, based on the first data and the computerized neural network, the second likelihood that the one or more conditions of the ambient environment of the first oil well have changed.

18. The system of claim 11, wherein the first data further comprises:

one or more temperature measurements generated by one or more temperature sensors.

19. The system of claim 11, wherein the first data further comprises:

one or more wind measurements generated by one or more wind sensors, wherein the one more wind measurements represents at least one of:

an intensity of wind in an environment of the first oil well, or a direction of wind in the environment of the first oil well.

20. The system of claim 11, wherein the computerized neural network is trained based a plurality of sets of training data regarding a plurality of second oil wells, wherein the sets of training data comprise, for each of the second oil wells:

one or more second thermal images of that second oil well generated by one or more second thermal cameras; and an indication whether a gas leak was present at that second oil well at a time that the one or more second thermal images of that second oil well were generated.

* * * * *